Jan. 25, 1949.                    R. M. RAMP                    2,460,029
                        RUSSIAN DANDELION SEED HARVESTER
Filed Aug. 2, 1946                                          5 Sheets-Sheet 1
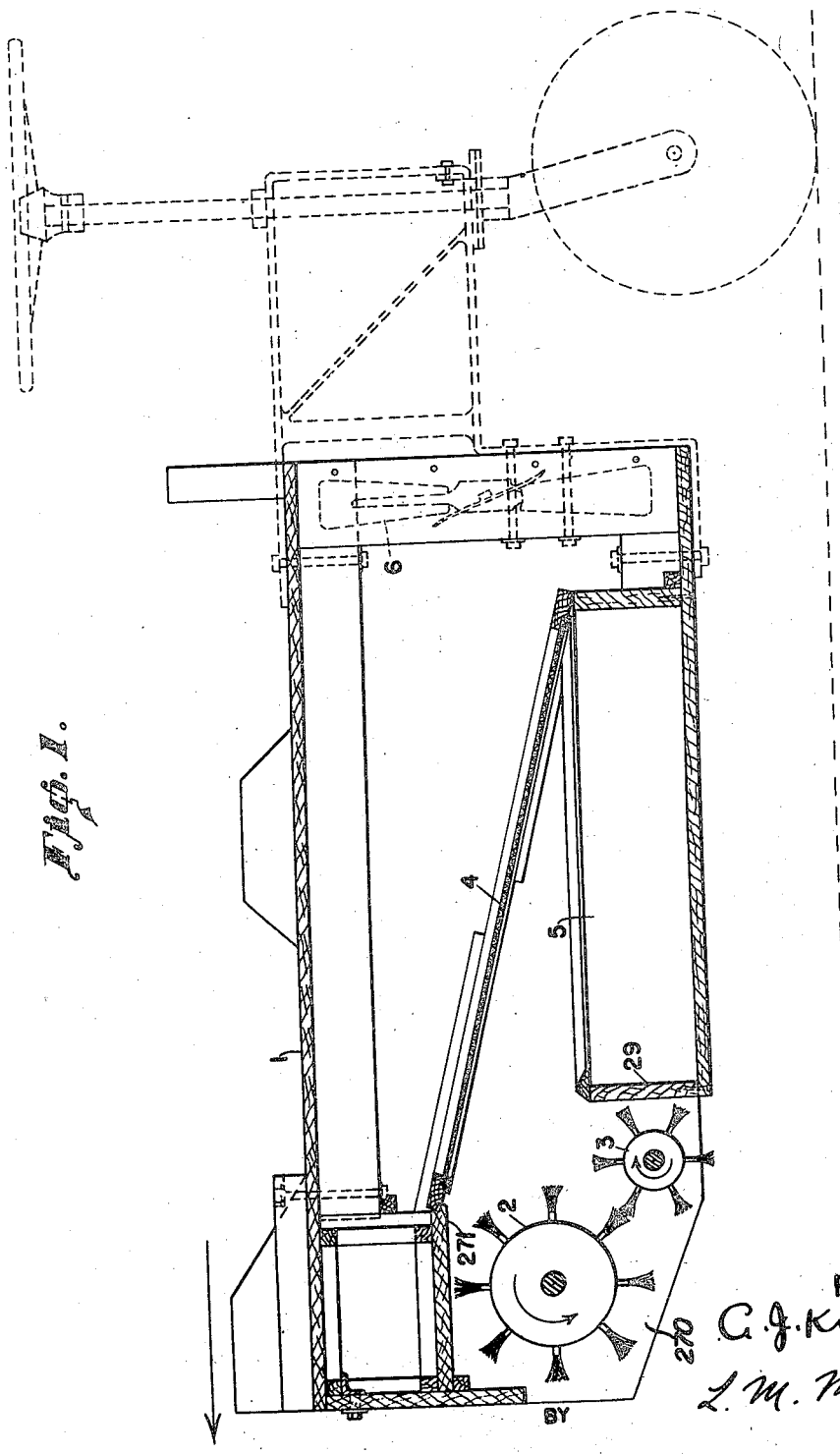
INVENTOR
R.M.RAMP
ATTORNEY

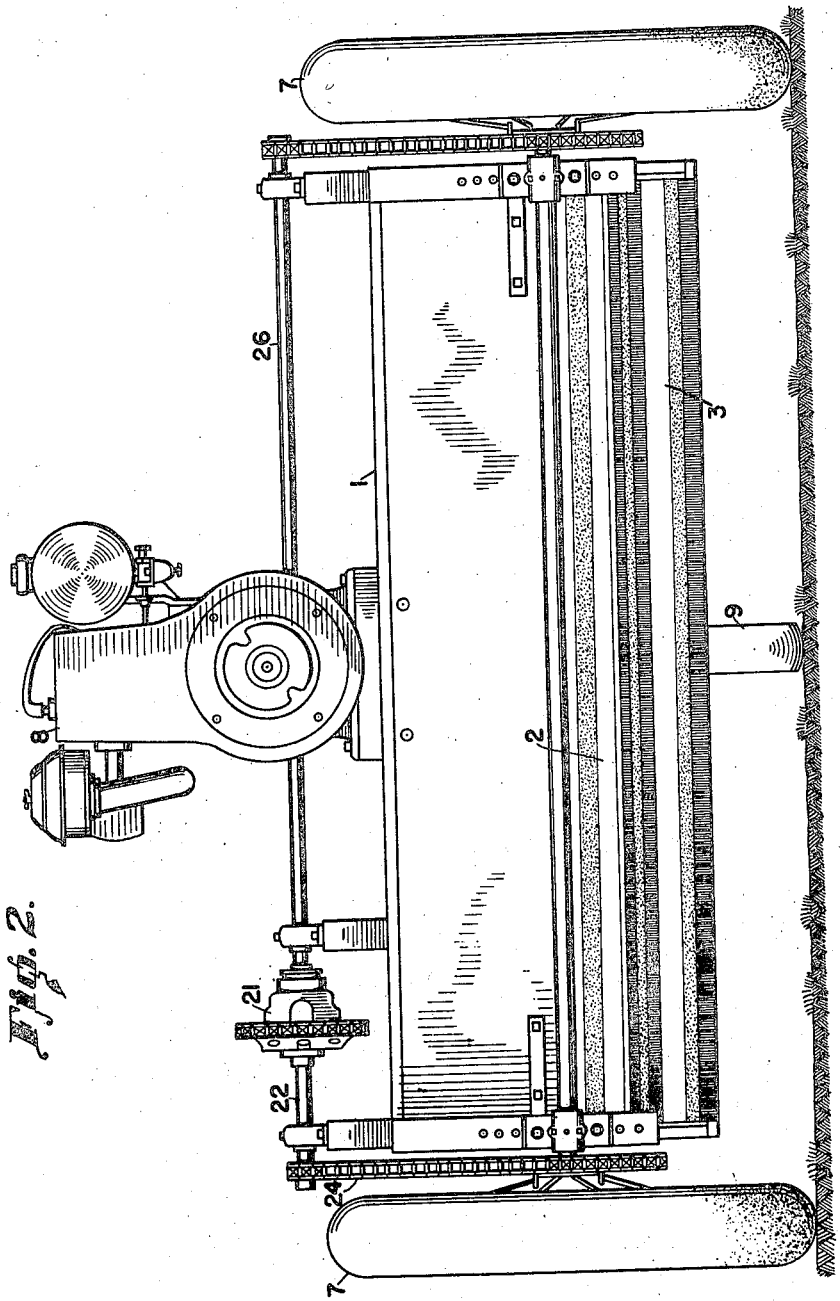

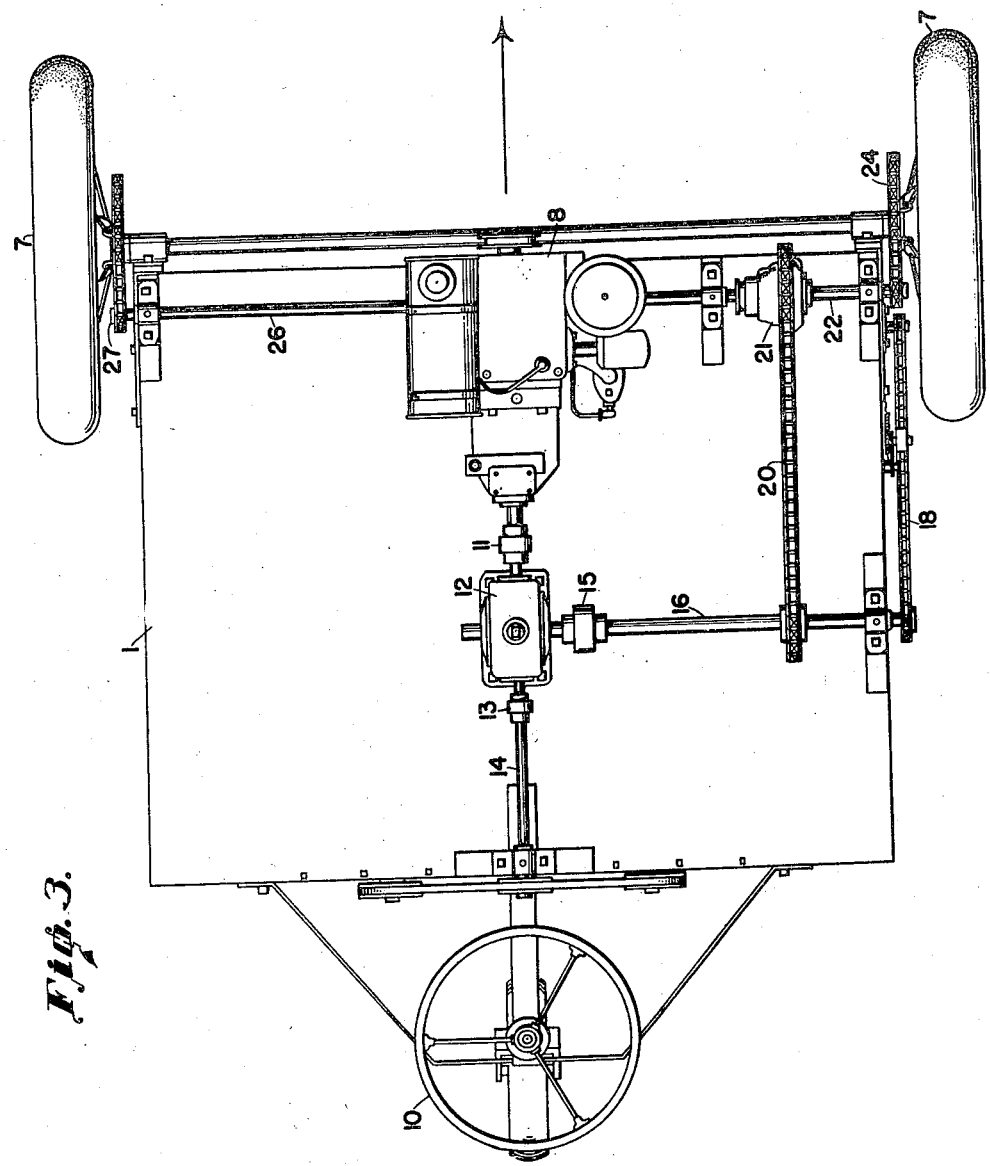

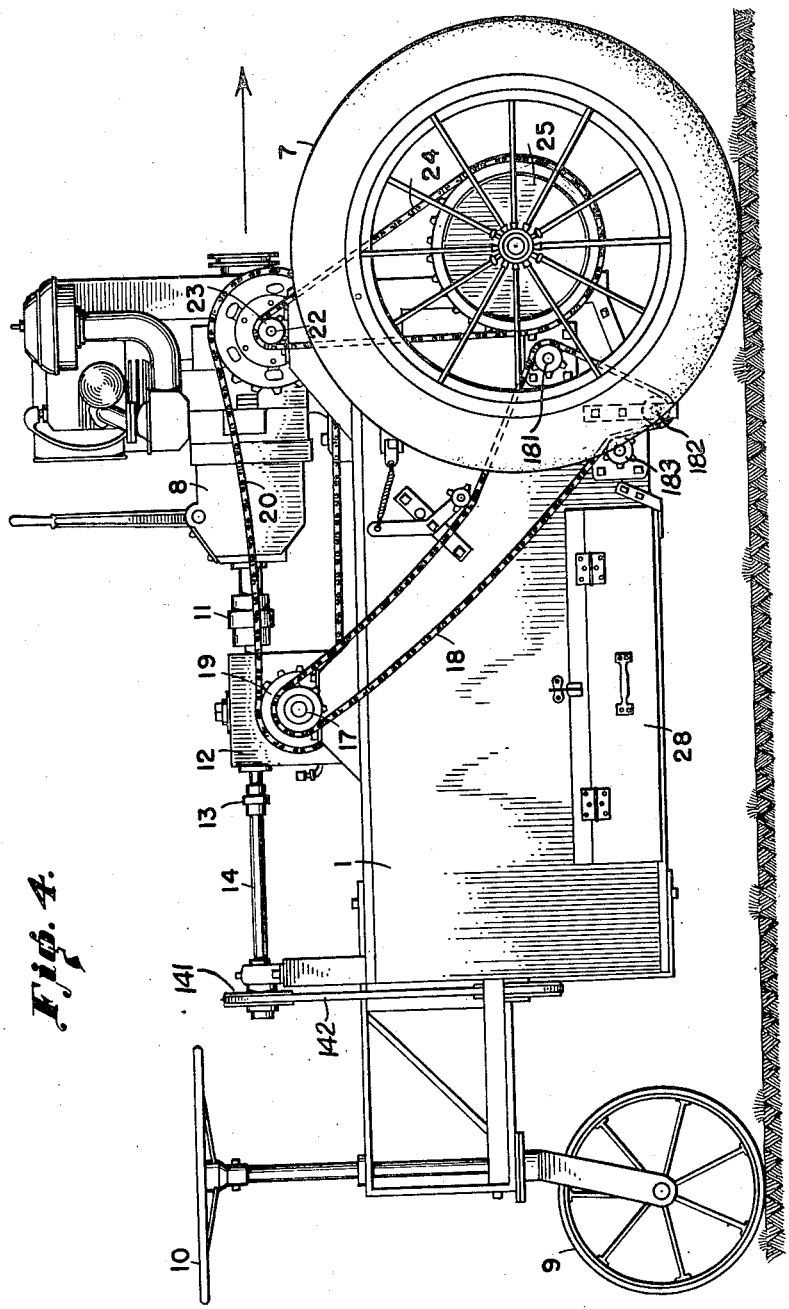

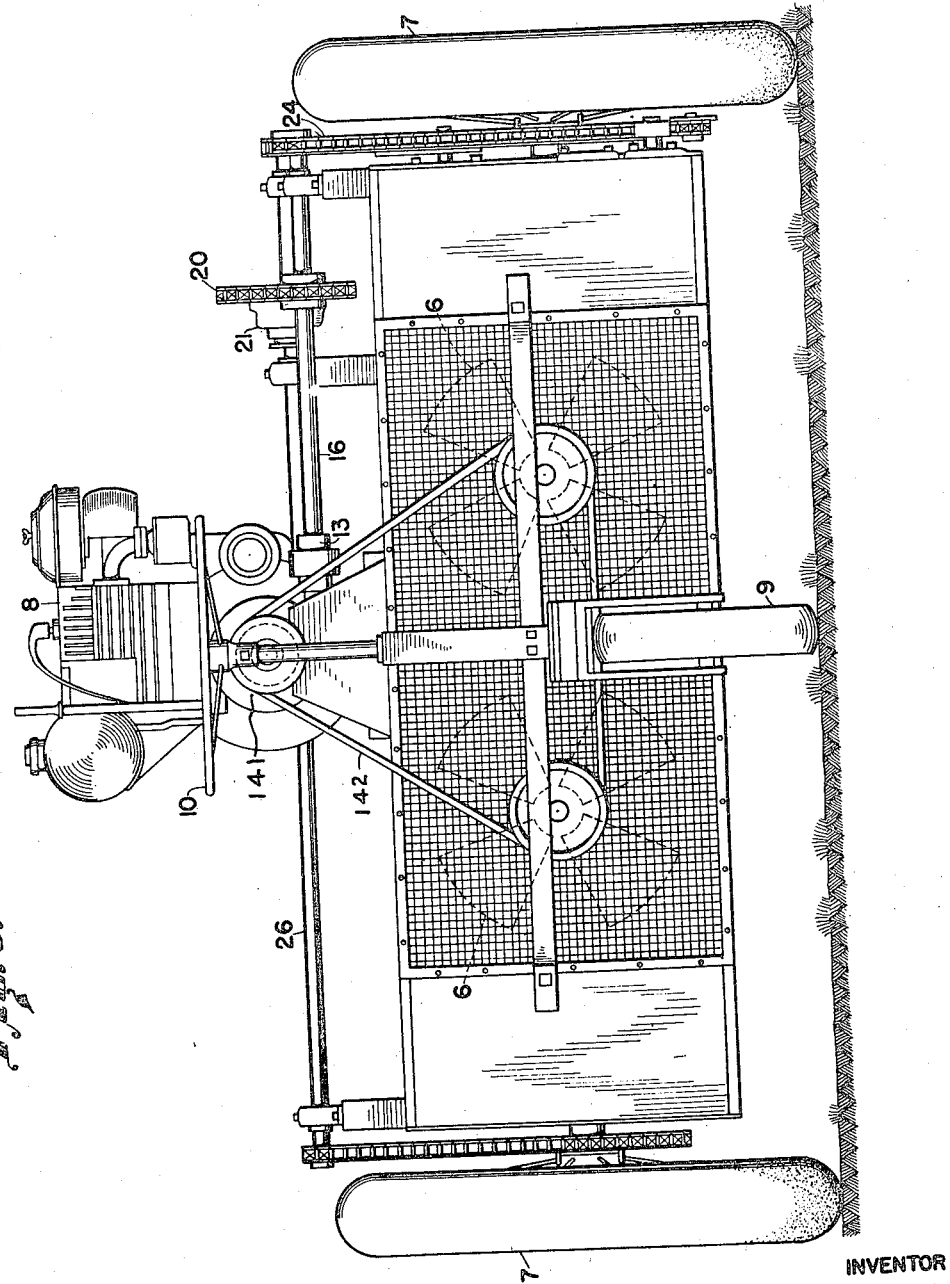

Patented Jan. 25, 1949

2,460,029

UNITED STATES PATENT OFFICE 2,460,029

RUSSIAN DANDELION SEED HARVESTER

Russell M. Ramp, Houma, La., assignor to the United States of America as represented by the Secretary of Agriculture Application August 2, 1946, Serial No. 687,861

2 Claims. (Cl. 56—19)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a device for harvesting seeds. It is especially designed to provide a multi-row machine to harvest Russian dandelion seed, which is fluffy, like the native dandelion seed. It can be employed to harvest other lightweight seed having like characteristics, sowed in rows or broadcast.

An object of this invention is to provide a machine which, as it travels along the rows, whisks the seed from the seed heads and projects and draws the seed against a wire screen.

A further object is to provide a means for whisking the seed from the seed heads comprising two rotary brushes placed adjacent each other, or in actual contact, the upper brush rotating counterclockwise, and the lower brush clockwise.

A still further object is to provide a screen disposed adjacent the brushes and against which the seeds are projected by the brushes and through which screen a seed propellant air current is drawn by fans or other means.

A still further object is to dispose said screen at an acute angle to the air current, so that as the seeds accumulate on the screen they are worked down to the lower end of the screen by the air current and collect below the screen.

The following description, considered together with the accompanying drawings, will more fully disclose this invention.

In the drawings:

Figure 1 is a vertical, longitudinal view partly in section.

Figure 2 is a vertical front view illustrating the two rotary brushes.

Figure 3 is a plan view showing the means for moving the driven wheels, the fans, and the rotary brushes.

Figure 4 is a side elevation.

Figure 5 is a rear elevation.

Turning to Figure 1, it may be seen that the machine comprises a housing 1 within which are mounted, from the front to the rear, a large brush 2, a smaller brush 3, a screen 4 adjacent the brushes and set at angle of about 23 degrees with respect to the air flow, a seed compartment 5 to catch the seeds, and two fans 6 to draw an air current from the brushes to and through the screen and to expel the air rearwardly.

The housing 1, which may be of plywood, is mounted on three wheels. The front two wheels 7 are drivers motivated by a five horsepower engine 8 (Fig. 3) supported on top of the housing. A single rear or guiding castor wheel 9 is controlled by an automobile type steering wheel 10. The engine 8 is connected through a clutch and a flexible coupling 11 to a worm gear speed reducer 12. From the speed reducer are driven two fans 6 at the rear, through the flexible coupling 13, the drive shaft 14, and a conventional fan pulley 141 and fan belt 142 shown in Figures 4 and 5. The brushes 2 and 3 are driven through the flexible coupling 15, drive shaft 16, sprocket 17, and chain 18. Chain 18 runs over upper brush sprocket 181, under idler 182, and over lower brush sprocket 183. Sprockets 181 and 183 are fixed on the ends of the brushes, which are rotatably mounted in conventional fashion in the sides of the housing. The right drive wheel is driven through sprocket 19, chain 20, differential 21, short shaft 22, sprocket pinion 23, chain 24, and sprocket 25. The left wheel is driven through differential 21, long shaft 26, sprocket 27, and a chain and main sprocket, as with the right wheel.

The seed drawers 28 within the compartment may be one or more in number. Two may be provided, and made removable through the side walls of the housing, as shown in Figure 4.

As shown in Figures 1 and 2, the seed stripper comprises two parallel brushes 2 and 3 rotatably mounted in the front end of the housing, transversely thereof. The upper and larger brush 2, which is rotated counterclockwise, sweeps or whisks the seed heads backward. The lower brush is rotated clockwise. The axis of the lower brush is preferably disposed below and rearwardly of the axis of the upper brush. As shown in Figures 1 and 2, the tufts of the brushes extend in a continuous row across the housing. The upper and lower brushes are placed across the opening 270 between the ledge 271 and front end 29 of the seed compartment.

The screen 4 is placed transversely of said housing. It is supported at its lower end on the rear end of the seed compartment and at its upper end on the ledge 27.

Means may be provided for raising and lowering the brushes and housing to adjust the implement for various heights of the plant. Such adjusting means is commonly employed, being for example, described in Guyle Patent 1,975,572.

The operation is as follows:

As the machine travels over the rows the brushes whisk the seed from the seed heads. The seeds are drawn into the machine by the fans located at the rear and are separated from the air current by the 40 x 40 mesh wire screen. As the seeds accumulate on the screen they are worked down to its lower end by the air current and collect in the seed receptacles.

Having thus described my invention, I claim:

1. A mobile seed harvester comprising a housing mobily supported for movement over the ground, the housing having an inlet opening in the bottom, the opening extending up the front of the housing; a rotary brush mounted in the housing adjacent the opening; a second rotary brush mounted parallel to the first brush and rearwardly of the latter, both brushes being positioned adjacent the opening in the bottom, a part of the second brush extending below the first brush, the periphery of the two brushes substantially contacting to whisk the seeds therebetween; means for rotating the upper brush and the lower brush in opposite directions about their axes, the front of the upper brush moving downwardly at the inlet opening; means for drawing air into said inlet opening and removing it from said housing, to draw the seeds into the housing; and means in the housing for separating the seeds from the air stream.

2. A mobile seed harvester comprising a housing mobily supported for movement over the ground, the housing having an inlet opening in the bottom, the opening extending up the front of the housing; a rotary brush mounted in the housing adjacent the opening; a second rotary brush mounted parallel to the first brush and rearwardly of the latter, both brushes being positioned adjacent the opening in the bottom, a part of the second brush extending below the first brush, the periphery of the two brushes substantially contacting to whisk the seeds therebetween; means for rotating the upper brush and the lower brush in opposite directions about their axes, the front of the upper brush moving downwardly at the inlet opening; means for drawing air into said inlet opening and removing it from said housing, to draw the seeds into the housing; and means in the housing for separating the seeds from the air stream, the second brush having a smaller diameter than the first, the means for rotating the brushes turning the upper brush at a greater linear peripheral speed than the second brush.

RUSSELL M. RAMP.

REFERENCES CITED

The following references are of record in the file of this patent:

UNITED STATES PATENTS

| Number | Name | Date |
|---|---|---|
| 498,133 | Mauermann | May 23, 1893 |
| 574,990 | Griffin | Jan. 12, 1897 |
| 1,122,375 | Engle | Dec. 29, 1914 |
| 1,130,847 | Schofield | Mar. 9, 1915 |
| 1,297,349 | Herr | Mar. 18, 1919 |
| 2,065,721 | Mutzbauer | Dec. 29, 1936 |